United States Patent [19]

Hasenauer

[11] Patent Number: 5,051,322
[45] Date of Patent: Sep. 24, 1991

[54] THERMAL INSULATION

[75] Inventor: Dieter Hasenauer, Weinheim, Fed. Rep. of Germany

[73] Assignee: Brown, Boveri & Cie AG, Mannheim-Käfertal, Fed. Rep. of Germany

[21] Appl. No.: 884,061

[22] Filed: Jul. 10, 1986

[30] Foreign Application Priority Data

Jul. 11, 1985 [DE] Fed. Rep. of Germany ....... 3524706

[51] Int. Cl.⁵ ............................................ H01M 10/50
[52] U.S. Cl. .................................... 429/120; 429/163; 220/72.1
[58] Field of Search ................. 429/120, 163; 220/72.1

[56] References Cited

U.S. PATENT DOCUMENTS

| | | | |
|---|---|---|---|
| 2,777,295 | 1/1957 | Bliss et al. | 220/72.1 |
| 2,972,474 | 2/1961 | Linde et al. | 429/163 |
| 3,837,918 | 9/1974 | Nakabayashi | 429/120 |
| 4,235,956 | 11/1980 | Gross et al. | 429/120 |
| 4,505,977 | 3/1985 | Hasenauer et al. | 429/120 |

FOREIGN PATENT DOCUMENTS 2645261 3/1978 Fed. Rep. of Germany ...... 429/120

*Primary Examiner*—Donald L. Walton
*Attorney, Agent, or Firm*—Herbert L. Lerner; Laurence A. Greenberg

[57] ABSTRACT

Thermal insulation with a double walled housing in which the space between the housing walls is evacuated and filled with insulating material and feedthroughs are provided between the interior of the housing and the outer area. The closure area of the housing is free of feedthroughs, and each boundary wall of each feedthrough is mechanically extended and connected vacuum tight to the housing walls.

2 Claims, 2 Drawing Sheets

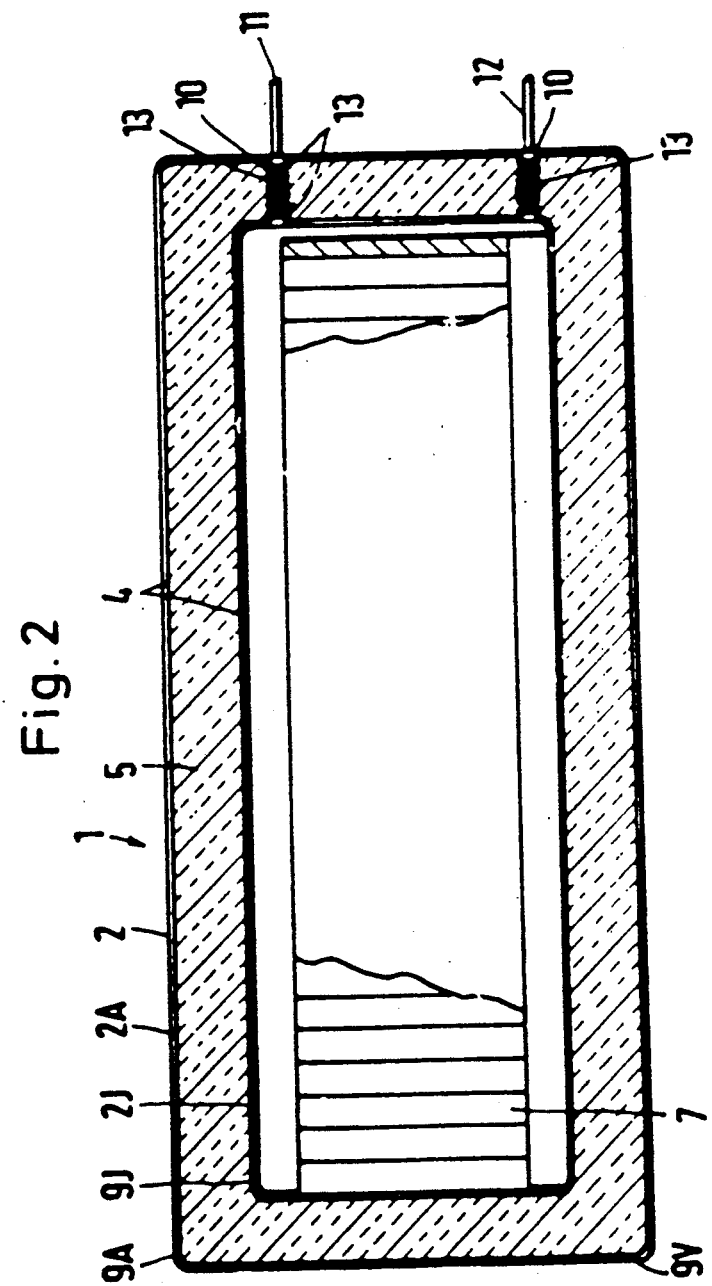

THERMAL INSULATION

BACKGROUND OF THE INVENTION

1. Field of the Invention

The invention relates to thermal insulation with a double walled housing in which the space between the housing walls is evacuated and filled with insulating material and feedthroughs are provided between the interior of the housing and the outer area.

2. Description of the Prior Art

Such thermal insulation is used in power engineering in apparatus in which the loss of heat is to be avoided. Thermal insulation is used primarily in high-temperature storage batteries of the alkali metal and chalcogen type which must be surrounded by heat-retarding material in order to prevent the storage cells from cooling off particularly in the operating pauses.

German Offenlegungsschrift DE-OS 32 47 968 discloses thermal insulation around a high-temperature storage battery. The thermal insulation is bounded on the inside and outside by a double-walled housing. Between the walls of the housing is an evacuated space which is filled with insulating material retarding the heat flux. The opening of the housing which exposes the interior of the thermal insulation, is closed off by a plug. The plug likewise has two walls with insulating material arranged between its housing walls. Feedthroughs go through the plug and cooling lines and electrical leads are brought through the feedthroughs.

A disadvantage of this thermal insulation is that there is a very large heat loss in the vicinity of the plug. This happens because the plug material does not have a large heat conduction coefficient and no high mechanical strength. The plug further has no flexible circular surface for sealing the interior airtight. A further disadvantage are the feedthroughs in the vicinity of the plug which cause a large heat loss.

SUMMARY OF THE INVENTION

It is therefore an object of the invention to provide thermal insulation for enclosing high temperature apparatus such as a high temperature storage battery which will minimize the heat losses from the enclosed apparatus.

With the foregoing and other objects in view, there is provided in accordance with the invention, thermal insulation, particularly adapted for enclosing high temperature apparatus and retarding heat loss therefrom, comprising: a double walled housing surrounding an interior space, said double walls spaced apart to form a space which is filled with insulating material and also evacuated, feedthroughs between the interior space of the housing and the outer area of the housing with each feedthrough having a boundary wall mechanically extended and connected vacuum tight to the housing walls, and a closure area of the housing free of feedthroughs.

Other features which are considered as characteristic for the invention are set forth in the appended claims.

Although the invention is illustrated and described herein as embodied in thermal insulation, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 2 is a variant of the thermal insulation shown in FIG. 1 but does not use a plug and instead uses closures of sheet metal to close off the interior of the housing.

DESCRIPTION OF THE PREFERRED EMBODIMENTS

Figure 1:
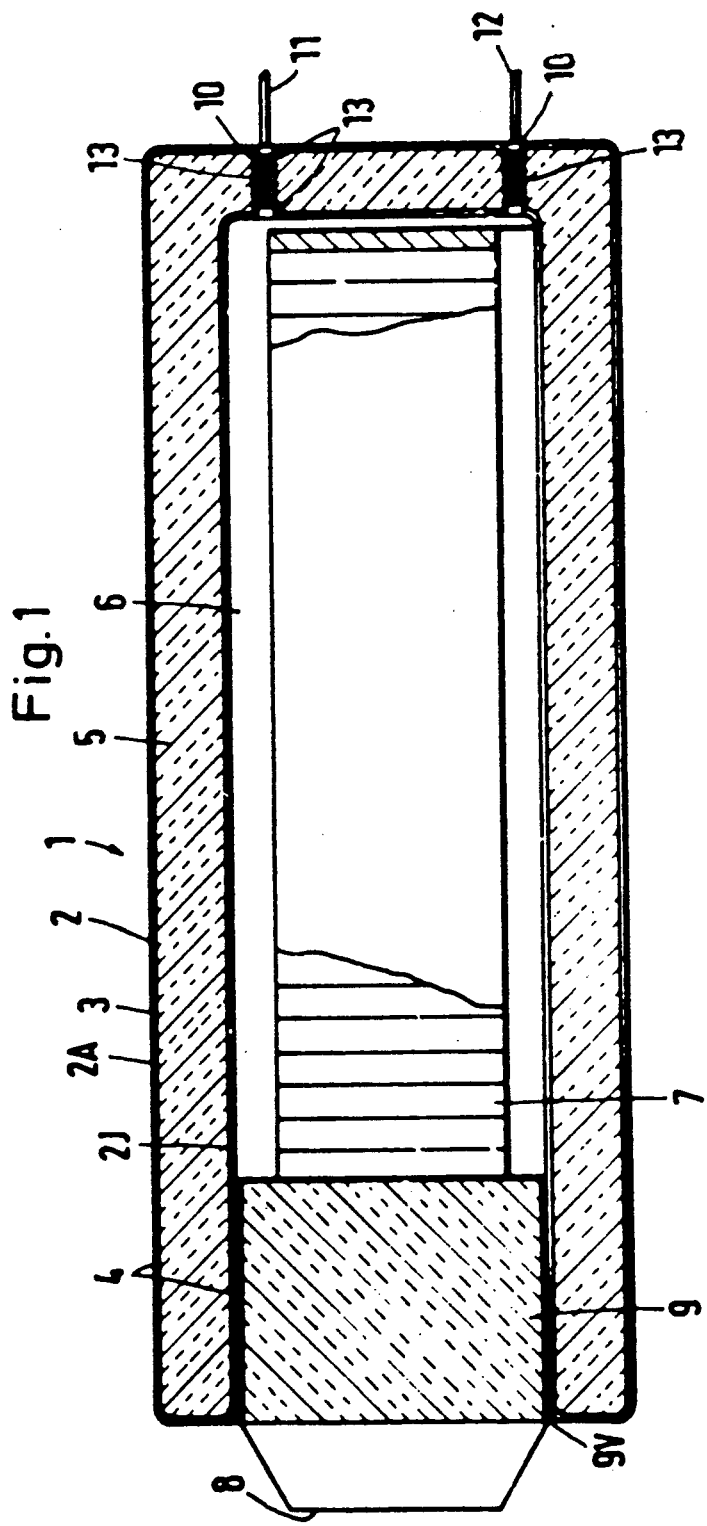
FIG. 1 diagrammatically illustrates thermal insulation in accordance with the invention in a vertical section showing a double walled housing with the space between the two walls of the housing filled with insulating material and the interior of the housing containing storage cells. At one end of the housing is an opening for insertion of the storage cells after which the opening is sealed by a plug filled with insulating material. At the end of the housing opposite to the plug are feedthroughs in the form of bellows which are welded vacuum tight to the outer and inner housing walls.

The invention relates to thermal insulation which is bounded by a double walled housing inward and outward. Insulating material is arranged between the housing walls. The opening of the housing is closed by a plug or closure sheets of metal. The feedthroughs for cooling lines and electrical leads are arranged between the interior of the housing and the outer space outside of the closing area of the opening. The boundary wall of each feedthrough is formed as a cylindrical bellows. Each boundary wall is preferably made of alloyed steel and is at most 0.1 to 0.2 mm thick. By separating the closing-off area and the feedthrough area, it is possible to close off the housing which bounds the thermal insulation inward and outward by a plug or by closure pieces of sheet metal. In particular, the housing can be closed off by closure pieces of sheet metal which are boiled or welded to the rest of the housing. The feedthroughs for the cooling line and the electric supply line are desirably arranged on the side opposite the closure area. The boundary wall of each feedthrough is in the form of a cylindrical bellows. This causes a mechanical extension of the feedthrough. Each boundary wall is preferably at most 0.1 to 0.2 mm thick and is made of alloyed steel. The boundary wall of each feedthrough is welded to the inner housing wall and the outer housing wall of the housing bounding the thermal insulation in a vacuum tight manner. The larger the number of folds in the boundary wall of each feedthrough, the better is also the heat insulation. The boundary wall constructed in this manner has, besides a low heat loss, the further advantage that it forms a flexible connection between the inner and the outer housing so that the housing overall can react better to mechanical stresses. The heat loss in the vicinity of the feedthroughs is at most 10% of the entire heat loss. 42% of the heat stored in the thermal insulation is lost via the closure area.

Due to the fact that the closure area is free of feedthrough, closing pieces of sheet metal can also be used for the closure instead of a plug. This means that the housing which bounds the thermal insulation can be made smaller and still have a larger interior. The invention will be explained further in the following, making reference to the drawings.

The thermal insulation 1, shown in FIG. 1 is bounded inward and outward by a prismatic housing 2 which is made with double walls. The outer housing wall 2A and the inner housing wall 2J are spaced to form a space 4 between the two walls. The housing walls 2A and 2J are welded vacuum tight so that the space 4 formed between them can be evacuated. In addition, the space 4 is filled with insulating material 5. Insulating materials in powder form as well as fiber and multilayer strata of mica foil or glass paper are suitable for this purpose. The housing 2 has an interior 6. The latter is suitable for accommodating components which are to be protected against heat losses. In the embodiment example shown here a multiplicity of storage cells 7 of the sodium and sulfur type are arranged in the interior of the space 6. The storage cells 7 are shown only schematically. Rechargeable electrochemical storage cells 7 of the sodium and sulfur type operate at a temperature of about 350° C. During the operation of the storage cells, the required heat is generated in sufficient quantity by the storage cells 7 themselves. During pauses in operation, however, the storage cell must be surrounded by thermal insulation which ensures that the operating temperature of the storage cells still prevails in the interior of the insulation after several hours of rest, so that the storage cells immediately work again even after an extended pause. In order to make it possible to insert the storage cells into the interior of the insulation 1, the housing 2 is provided with an opening 8. The latter is located at the first end face of the housing 2 and is closed by a plug 9. The core of the plug 9 is likewise formed of insulating material 5 which is chosen so that the heat losses in the vicinity of the opening 8 and the plug 9 are reduced to a minimum. The closing area of the opening is designated 9 V. As can further be seen from FIG. 1, the housing is provided on the side opposite the opening 8 with feedthroughs 10 for cooling lines 11 and electrical leads 12.

Each feedthrough 10 is bounded by a boundary wall 13 which is formed as a cylindrical bellows. The feedthroughs 10 go through the thermal insulating material 5 and are welded vacuum tight to the outer and inner housing wall 2A, 2J. The boundary walls 13 of the feedthroughs 10 are made of alloyed steel and are at most 0.1 to 0.2 mm thick. Since the boundary walls 13 are shaped as bellows, the connection between the interior 6 and the outer region of the thermal insulation 1 is extended and the heat loss is reduced thereby. The larger the number of folds in each boundary wall 13, the smaller is the heat loss. However, the spacing between the folds should be chosen so that they don't touch each other, since otherwise the heat loss may be decreased slightly.

FIG. 2 shows a variant of the thermal insulation 1 according to the invention. The latter is likewise bounded by a double walled housing 2 inward and outward. The spacing between the inner housing wall 2J and the outer housing wall 2A is chosen to provide a space 4 which contains the insulating material 5. Also, space 4 is evacuated. The interior 6 of the thermal insulation is provided for receiving storage cells 7 of the sodium and sulfur type. Deviating from the embodiment example shown in FIG. 1, the thermal insulation 1 shown here is permanently closed off by closures of sheet metal 9A and 9J. The inner closure of sheet metal 9J is permanently welded to the inner housing wall 2J, while the outer closure of sheet metal 9A is likewise welded permanently to the outer housing wall 2A. The distance between the closure sheet metal pieces 9A and 9J is chosen so that between them, the same spacing is formed as between the two housing walls 2A and 2J. As a result of the housing walls 2A and 2J and the closures 9A and 9J, a coherent space 4 is formed which is completely filled with insulating material 5. The closure area is designated 9 V. The closure metal sheets 9A and 9J are connected vacuum tight to the housing walls 2A and 2J, so that the space 4 can be evacuated. As can be seen further from FIG. 2, the feedthroughs 10 for the cooling lines 11 and the electrical leads 12 are arranged between the storage cells 7 and the outer area on the side of the housing 2 opposite the closure metal sheets, particularly at the second end face thereof. Each feedthrough 10 is also bounded here outward by a boundary wall 13 in the form of a cylindrical bellows. The boundary wall 13 is made of alloyed steel and is at most 0.1 to 0.2 mm thick. In addition, it is welded vacuum tight to the inner housing walls 2J and the outer housing wall 2A.

Due to the permanent closure of the housing 2 by the closure metal sheets 9A and 9J, the thermal insulation can be made shorter in contrast to the embodiment shown in FIG. 1. The same number of storage cells can nevertheless be accommodated in its interior 6. It is possible, on the other hand, to design the thermal insulation shown here as long as the one shown in FIG. 1 and to accommodate a larger number of storage cells in the interior 6 than is the case of the housing 2 which uses a plug 9 for the closure.

The invention is not limited only to the embodiment examples shown in FIGS. 1 and 2. The invention includes other embodiments in which the feedthroughs 10 are not arranged on the side of the housing opposite the closure sheet metal parts 9A, 9J or the plug 9. In such embodiment examples, the feedthroughs 10 are arranged in the vicinity of the side surfaces of the housing 2 adjoining the closure sheet metal parts 9A and 9J or the plug 9, respectively.

The foregoing is a description corresponding, in substance, to German application P 35 24 706.1, dated July 11, 1985, international priority of which is being claimed for the instant application and which is hereby made part of this application. Any material discrepancies between the foregoing specification and the specification of the aforementioned corresponding German application are to be resolved in favor of the latter.

I claim:

1. Thermal insulation, particularly adapted for enclosing high temperature apparatus and retarding heat loss therefrom, comprising: a double walled housing surrounding an interior space, said double walls spaced apart to form a space which is filled with insulating material and also evacuated, feedthroughs between the interior space of the housing and the outer area of the housing with each feedthrough having a boundary wall mechanically extended only to the housing walls, in the form of a cylindrical bellows made of a thermally poorly conducting, very thin material connected vacuum tight to the housing walls, and a closure area of the housing free of feedthroughs.

2. Thermal insulation particularly adapted for enclosing high temperature apparatus and retarding heat loss therefrom, comprising: a double walled housing surrounding an interior space, said double walls spaced apart to form a space which is filled with insulating material and also evacuated, feedthroughs between the interior space of the housing and the outer area of the housing with each feedthrough having a boundary wall mechanically extended only to the housing walls, in the form of a cylindrical bellows made of alloyed steel and is at most 0.1 to 0.2 mm thick, and connected vacuum tight to the housing walls and a closure area of the housing free of feedthroughs.

* * * * *